US012089750B2

(12) United States Patent
Lee

(10) Patent No.: US 12,089,750 B2
(45) Date of Patent: Sep. 17, 2024

(54) TABLE MADE ENTIRELY FROM TEMPERED GLASS

(71) Applicant: Juifeng Lee, Concord, CA (US)

(72) Inventor: Juifeng Lee, Concord, CA (US)

( * ) Notice: Subject to any disclaimer, the term of this patent is extended or adjusted under 35 U.S.C. 154(b) by 1036 days.

(21) Appl. No.: 16/914,439

(22) Filed: Jun. 28, 2020

(65) Prior Publication Data
US 2020/0329874 A1 Oct. 22, 2020

Related U.S. Application Data

(63) Continuation of application No. 14/155,345, filed on Mar. 8, 2014, now abandoned.

(51) Int. Cl.
| A47C 5/00 | (2006.01) |
| A47B 97/00 | (2006.01) |
| A47C 11/00 | (2006.01) |
| C03B 23/025 | (2006.01) |
| C03B 27/044 | (2006.01) |
| A47B 7/00 | (2006.01) |

(52) U.S. Cl.
CPC ............... *A47C 5/00* (2013.01); *A47B 97/00* (2013.01); *A47C 11/00* (2013.01); *C03B 23/0252* (2013.01); *C03B 27/0447* (2013.01); *A47B 7/00* (2013.01); *A47B 2200/008* (2013.01); *A47B 2220/008* (2013.01); *Y10T 156/1002* (2015.01)

(58) Field of Classification Search
CPC .. A47C 5/00; A47B 97/00; A47B 7/00; A47B 2220/008
USPC ...................................... 248/188.9
See application file for complete search history.

(56) References Cited

U.S. PATENT DOCUMENTS

| 1,807,288 A | 5/1931 | Sigmund |
| 3,502,022 A | 3/1970 | Wood |
| 3,573,889 A | 4/1971 | McMaster et al. |
| 3,958,517 A * | 5/1976 | Jay .......................... A47B 13/12 248/188 |

(Continued)

FOREIGN PATENT DOCUMENTS

| CN | 87200608 U | 11/1987 |
| CN | 101243924 A1 | 8/2008 |

(Continued)

OTHER PUBLICATIONS

Andrew Pearson Design, collection of images and product description of glass tables, from company web site, captured Jan. 10, 2014, Mt. Airy, North Carolina.

(Continued)

*Primary Examiner* — Jose V Chen

(57) ABSTRACT

A table can be made entirely from tempered glass. Structural components including the table top, end pieces, and a stabilizing cross piece can be made from glass. Glass connectors can be used to attach the structural components. The structural components of the table can be shaped to provide shapes that can become an integral part of the design. Rubber feet can be used to protect the glass and floors. The glass can be printed using a high temperature printing process to provide visual appeal to the overall design. The table can be particularly suited to outdoor use due to its durability and ease of cleaning. The table can also incorporate bent tempered glass to provide strength and alternative design options.

14 Claims, 22 Drawing Sheets

(56) References Cited

U.S. PATENT DOCUMENTS

| | | | |
|---|---|---|---|
| 4,086,857 A * | 5/1978 | Igarashi | A47B 57/54 108/106 |
| 4,500,147 A | 2/1985 | Reister | |
| 4,738,704 A | 4/1988 | Vanaschen et al. | |
| 4,805,541 A * | 2/1989 | Drane | A47B 13/08 108/157.15 |
| 4,929,488 A | 5/1990 | Livi | |
| 4,951,181 A | 8/1990 | Phillips | |
| 5,072,532 A | 12/1991 | Kelly | |
| 5,125,348 A * | 6/1992 | Horwitz | A47B 91/005 108/186 |
| 5,189,952 A | 3/1993 | Ohmura et al. | |
| 5,246,477 A | 9/1993 | Kramer | |
| 5,294,494 A | 3/1994 | Yang | |
| 5,404,822 A | 4/1995 | Jaskiewicz | |
| 5,443,669 A | 8/1995 | Tunker | |
| 5,669,951 A | 9/1997 | Eichhorn | |
| 6,014,873 A | 1/2000 | Hirotsu | |
| 6,068,914 A | 5/2000 | Boire et al. | |
| 6,257,022 B1 | 7/2001 | Caplan et al. | |
| 6,287,996 B1 | 9/2001 | Chiba et al. | |
| 6,375,332 B1 | 4/2002 | Whinney | |
| 6,574,896 B1 | 6/2003 | Howell | |
| 7,955,470 B2 | 6/2011 | Kapp et al. | |
| 8,286,561 B2 * | 10/2012 | Driver | F25D 25/024 108/108 |
| 2002/0108542 A1 * | 8/2002 | Wilton | A47F 5/10 108/118 |
| 2003/0038054 A1 * | 2/2003 | Hurley | B65D 81/056 206/453 |
| 2004/0089775 A1 * | 5/2004 | Shaw | A47B 95/043 248/346.11 |
| 2004/0202795 A1 | 10/2004 | Sakoske | |
| 2004/0226492 A1 | 11/2004 | Carter | |
| 2006/0096507 A1 * | 5/2006 | Smith | A47B 81/06 108/50.02 |
| 2006/0112729 A1 | 6/2006 | Sakoske | |
| 2006/0147292 A1 | 7/2006 | Lebot et al. | |
| 2006/0150680 A1 | 7/2006 | Hill et al. | |
| 2007/0006781 A1 * | 1/2007 | Xiang | A47B 13/12 108/27 |
| 2007/0031603 A1 | 2/2007 | Eron | |
| 2009/0250568 A1 | 10/2009 | Morita | |
| 2010/0330339 A1 | 12/2010 | Pomeroy et al. | |
| 2011/0303124 A1 * | 12/2011 | Tseng | A47B 13/12 108/23 |
| 2012/0196099 A1 | 8/2012 | Pieters et al. | |
| 2012/0318946 A1 * | 12/2012 | Schlueter | E04C 3/40 248/163.1 |
| 2013/0040116 A1 | 2/2013 | Henze et al. | |
| 2013/0187983 A1 | 7/2013 | Eron | |
| 2014/0272206 A1 | 9/2014 | Walp | |
| 2014/0272338 A1 | 9/2014 | Vandal et al. | |
| 2016/0143431 A1 * | 5/2016 | Lee | A47B 17/03 108/92 |

FOREIGN PATENT DOCUMENTS

| | | |
|---|---|---|
| CN | 201468591 U | 5/2010 |
| DE | 3326845 A1 | 2/1985 |
| DE | 202005014172 U1 | 3/2006 |
| EP | 1365931 B1 | 6/2004 |
| EP | 1448485 B1 | 1/2007 |
| EP | 2431340 A1 | 3/2012 |
| GB | 2188873 A | 10/1987 |

OTHER PUBLICATIONS

Avetex Furniture, Modern Glass: Why glass furniture is stylish and easy, from blog on company web site, Dec. 1, 2012, San Francisco, California.

Fancy Cribs blog, 37 Modern Furniture Designs, captured Mar. 8, 2014, Pitesti, Romania.

Fiam Italia Spa, collection of images of Fiam Bright Contemporary glass writing desk by Valerio Cometti, from Fiam web site, captured Jan. 10, 2014, Tavullia, Italy.

Fiam Italia Spa, collection of images of Fiam Ghost Monolithic chair in 12mm thick curved glass by Cini Boeri, from Fiam web site, captured Mar. 8, 2014, Tavullia, Italy.

Hurwitz Mintz, image of Tempered glass rectangular end table, from company web site, captured Jan. 11, 2014, Metairie, Louisiana.

Internet Archive Wayback Machine record of IMM Cologne, home page of web site, Jan. 15, 2013, Cologne, Germany.

Internet Archive Wayback Machine record of IMM Cologne, home page of web site, Jan. 3, 2012, Cologne, Germany.

LiiU, LiiU announces their newest art glass tables in IMM Cologne 2012, Jan. 11, 2012, Taipei, Taiwan.

LiiU, The most popular product items in IMM Cologne 2013, Feb. 1, 2013, Taipei, Taiwan.

Linhao Art Glass Co., Ltd., glass table product descriptions, from company web site, captured Jan. 11, 2014, Foshan, China.

Liquidoranges studio, LLC, description of art glass tables and process, from company web site, captured Jan. 11, 2014, Boston, Massachusetts.

Minimalisti.com, online magazine, images from review of glass table by Zaha Hadid, Dec. 7, 2013, Burgas, Bulgaria.

National Glass Association—Glass Magazine, Guide to Decorative Glass—Definitions, options & applications, May 4, 2011, Vienna, Virginia.

Philip Johnson Glass House, home page and collection of images from web site, captured Mar. 8, 2014, New Canaan, Connecticut.

Sans Soucie Art Glass Studios, Inc., Glass Tables Gallery, from company web site, captured Mar. 8, 2014, Palm Desert, California.

Sans Soucie Art Glass Studios, Inc., Mirrors Gallery, from company web site, captured Mar. 8, 2014, Palm Desert, California.

Santambrogio Milano, Product catalog, downloaded Jan. 10, 2014, Milano, Italy.

Santambrogio Milano, Public relations information, downloaded Jan. 10, 2014, Milano, Italy.

Tuvie—design of the future, blog, review of Teckell by Adriano Design, Apr. 2011, Turin, Italy.

Ultra Modern, All Glass Furniture, from company web site, captured Jan. 10, 2014, Dallas, Texas.

URdesign, Glass office for Soho China in Shanghai by AIM Architecture, Nov. 20, 2013, Milano, Italy.

VirtualExpo, ArchiExpo web page on driade EGESO Contemporary wall mirror by Vittorio Locatelli, captured Mar. 8, 2014, Marseille, France.

VirtualExpo, ArchiExpo web page on driade TIKAL Contemporary wall mirror by Vittorio Locatelli, captured Mar. 8, 2014, Marseille, France.

VirtualExpo, ArchiExpo web page on Fiam Bright Contemporary glass writing desk by Valerio Cometti, captured Mar. 8, 2014, Marseille, France.

VirtualExpo, ArchiExpo web page on Kartell All Saints Contemporary wall mirror by Laufen, captured Mar. 8, 2014, Marseille, France.

Young, Mike, Printing on Glass: Technologies and Applications, presented at the Specialty Graphic Imaging Association Expo 2013, Oct. 23, 2013, Orlando, Florida.

Google, Inc., results of image search on "tempered glass furniture", search run on Mar. 9, 2014, Mountain View, California.

UWE (DE 20 2005 014 172)—English language machine translation accessed at patents.google.com Aug. 31, 2015.

Zhang (CN201468591 U)—English language machine translation accessed at patents.google.com Aug. 31, 2015.

Homelife ("How to make a picture-frame mirror", http://www.homelife.com.au/decorating/living+dining/how+to+make+a+picture+frame+mirror,4965 ; webpage entry cached by Google.com on Mar. 13, 2009).

(56) References Cited

OTHER PUBLICATIONS

GANA (Glass Association of North America, "Laminated Glass Use in Furniture", Glass Information Bulletin GANA LD 10-0712—Jul. 2012, http://store.glasswebsite.com/products/laminated-glass-use-in-furniture).

C. R. Laurence Company Glass Bonding System Catalog (http://www.crlaurence.com/adv/catalog_library/zips/gb10.pdf), copyright 2009.

S. C. Laurence Company, "Standoff and Clamp Hardware: SC12 Catalog", Coypright 2011, available online and in print as of Jan. 24, 2011.

GlassOnWeb.com; (https://www.glassonweb.com/news/crl-introduces-new-standoff-and-clamp-hardware-catalog-sc12)—Evidence of SC12 Catalog publication date.

\* cited by examiner

TABLE MADE ENTIRELY FROM TEMPERED GLASS

CROSS-REFERENCE TO RELATED PATENT APPLICATIONS

This application is a continuation of application Ser. No. 14/155,345, titled "METHODS FOR CREATING TEMPERED GLASS ART FURNITURE AND ACCESSORIES" and filed on Jan. 14, 2014, the entirety of which is hereby incorporated by reference, which claims priority to and benefit of U.S. Provisional Patent Application No. 61/752,296, titled "TEMPERED GLASS ART FURNITURE AND ACCESSORIES" and filed on Jan. 14, 2013, the entirety of which is hereby incorporated by reference.

FIELD OF THE DISCLOSURE

The present disclosure generally relates to creating glass articles. More specifically, the present disclosure relates to creating tempered glass art furniture and accessories.

BACKGROUND OF THE INVENTION

Tempered glass can be used as a material when creating furniture and accessories. High temperature glass printing can be used to print patterns on glass that may then be tempered.

SUMMARY OF THE INVENTION

Furniture design has remained largely unchanged over the past few hundred years. The same designs are used with minor modifications, sometimes incorporating new materials as they become available. The lack of new options in furniture makes it difficult for decorators to provide truly fresh and innovative interior designs.

Glass is an ideal material for furniture design in many ways. It is durable, weather resistant, easy to clean, beautiful to look at, and carries a connotation of high quality. Usually, glass is only used in furniture in incidental ways. For example, it might be used for a table top, or as an accent to a chair. It is frequently found as the integral design material in lighting, but only because of its unequaled transparency quality. Glass has traditionally been considered less safe than other materials for applications involving direct contact with the body because of the way plate glass breaks into large shards with extremely sharp edges.

The present disclosure describes a method for using tempered glass to create furniture and accessories that can be entirely made from glass. The glass components can be structural members of the furniture and accessories, and can be connected together with glass connectors that may be glued directly to the surface of the tempered glass, and then may be connected together with assembly hardware. The tempered glass can overcome the objections of safety because it can be much stronger than plate glass, and if it does break, it can break into small pieces without sharp edges.

In some embodiments, the present disclosure describes a method for using high temperature glass printing to print patterns on the components of the furniture and accessories that can make them visually attractive as items that can be referred to as art glass.

At least one aspect of the present disclosure is directed to a method for creating a piece of furniture entirely made of glass. The method can include printing, by a high temperature digital glass printer, a pattern on components of the piece of furniture. The method can include tempering, by a glass tempering machine, the components of the piece of furniture. The method can include assembling, by an assembler, the components to make the piece of furniture. The components may serve as structural elements of the piece of furniture.

At least one aspect of the present disclosure is directed to a method for creating a decorative mirror entirely made of glass. The method can include printing, by a high temperature digital glass printer, a pattern on a glass frame for the decorative mirror. The method can include tempering, by a glass tempering machine, the glass frame. The method can include fastening, by a fastener, the frame to the decorative mirror.

At least one aspect of the present disclosure is directed to a method for creating a pattern on a bent glass. The method can include printing, by a high temperature digital glass printer, the pattern on a flat glass. The method can include tempering, by a glass tempering machine, the flat glass. The method can include bending, by the glass tempering machine, the flat glass into the bent glass.

At least one aspect of the present disclosure is directed to a method for creating a chair. The method can include tempering, by a glass tempering machine, a first flat glass. The method can include bending, by the glass tempering machine, the first flat glass into a first bent glass. The method can include assembling, by an assembler, the first bent glass and a supporting structure. The first bent glass may be the seat of the chair.

BRIEF DESCRIPTION OF THE DRAWINGS

The details of one or more embodiments of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Figure 1:
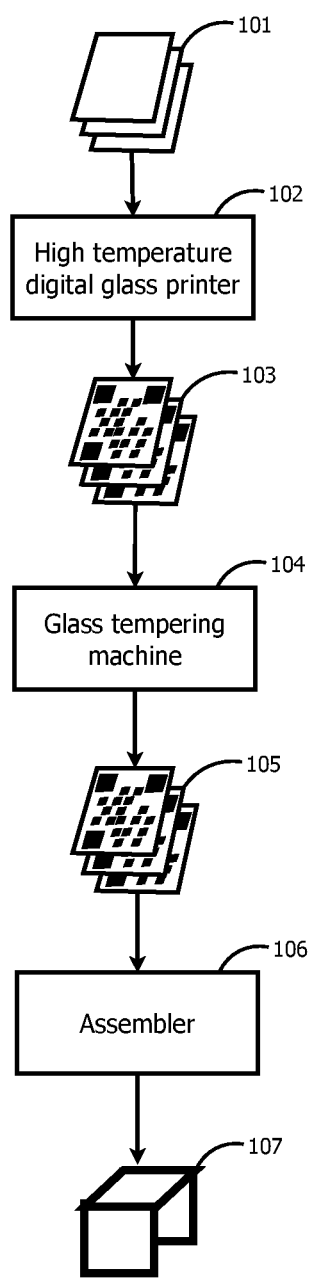
FIG. 1 is an illustrative diagram of a method for creating a piece of furniture entirely made of glass.

FIG. 1 is an illustrative diagram of a method for creating a piece of furniture entirely made of glass. The components 101 for creating the furniture can be printed by a high temperature digital glass printer 102 to make printed components 103 with patterns printed on them. The printed components 103 can be tempered by a glass tempering machine 104 to make tempered glass components 105 with patterns printed on them. The tempered glass components 105 can be assembled by an assembler 106 to create the piece of furniture 107 entirely made of glass.

Figure 2:
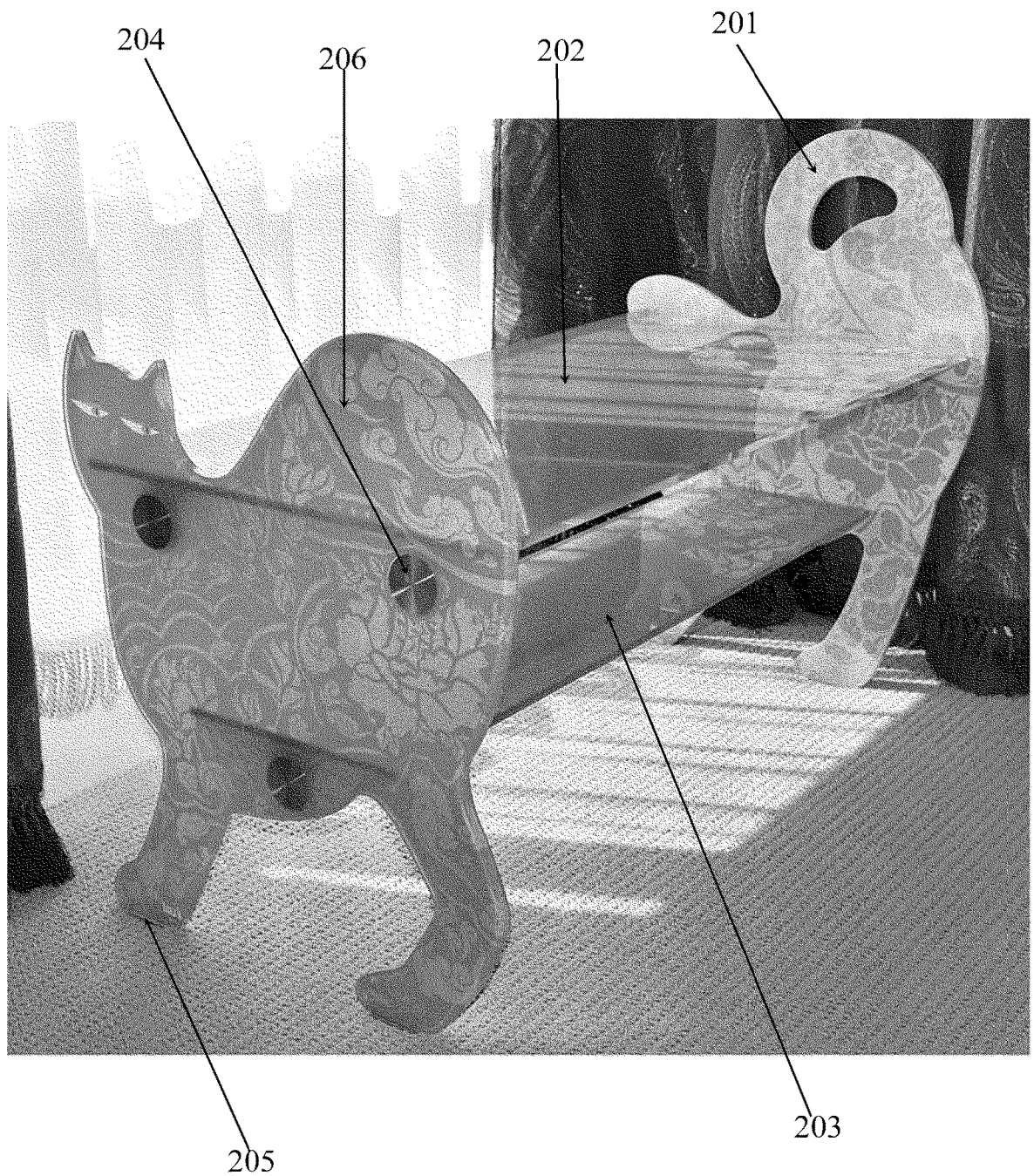
FIG. 2 is an illustrative example of an embodiment of a table that is entirely constructed from glass.

FIG. 2 is an illustrative example of an embodiment of a table that is entirely constructed from glass. The two end pieces 201 and 206 can be shaped in a way to convey an interesting design, as will be illustrated with respect to FIG. 10 and FIGS. 11A-11B. The table top 202 can be attached to the end pieces 201 and 206 using connectors such as 204 as will be illustrated with respect to FIG. 12A and FIG. 12B. The cross piece 203 can provide further stability to the structure as well as additional storage for items underneath the table top 202, and can be attached to the end pieces 201 and 206 using connectors such as 204. Small feet such as 205 can prevent damage to the edges of the end pieces 201 and 206, and can prevent marking of the floor by the table. Glass components 201, 206, 202, and 203 can be printed with a pattern as will be illustrated with respect to FIGS. 9A-9D. The printing can provide a visual appeal to the overall design that can work as a true piece of art as well as a functioning table.

Figure 3:
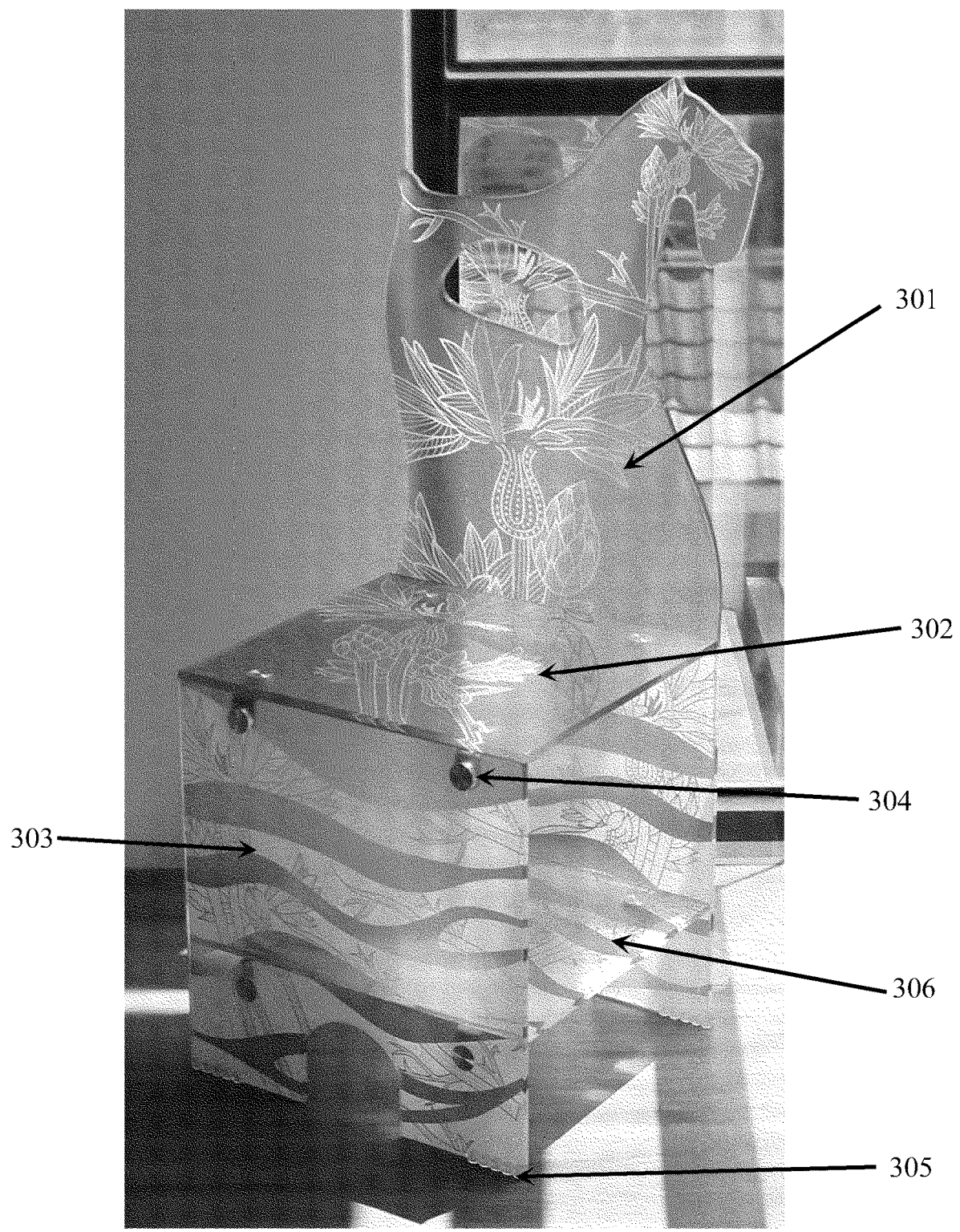
FIG. 3 is an illustrative example of an embodiment of a chair that is entirely constructed from glass.

FIG. 3 is an illustrative example of an embodiment of a chair that is entirely constructed from glass. The chair back 301 can be shaped in a way to convey an interesting design as will be illustrated with respect to FIGS. 11A-11B. The seat 302 can be attached to the back 301 as well as the front piece 303 using connectors such as 304 as will be illustrated with respect to FIGS. 12A-12B. The cross piece 306 can provide further stability to the structure as well as additional storage for items such as reading material, and can be attached to the back 301 and front 303 using connectors such as 304. Small feet such as 305 can prevent damage to the edges of the back 301 and front 303, and can prevent any marking of the floor by the chair. Components of the chair 301, 302, 303, and 306 can be printed with a pattern as will be illustrated with respect to FIGS. 9A-9D. The printing can provide a visual appeal to the overall design that can work as a true piece of art as well as a functioning chair.

Figure 4:
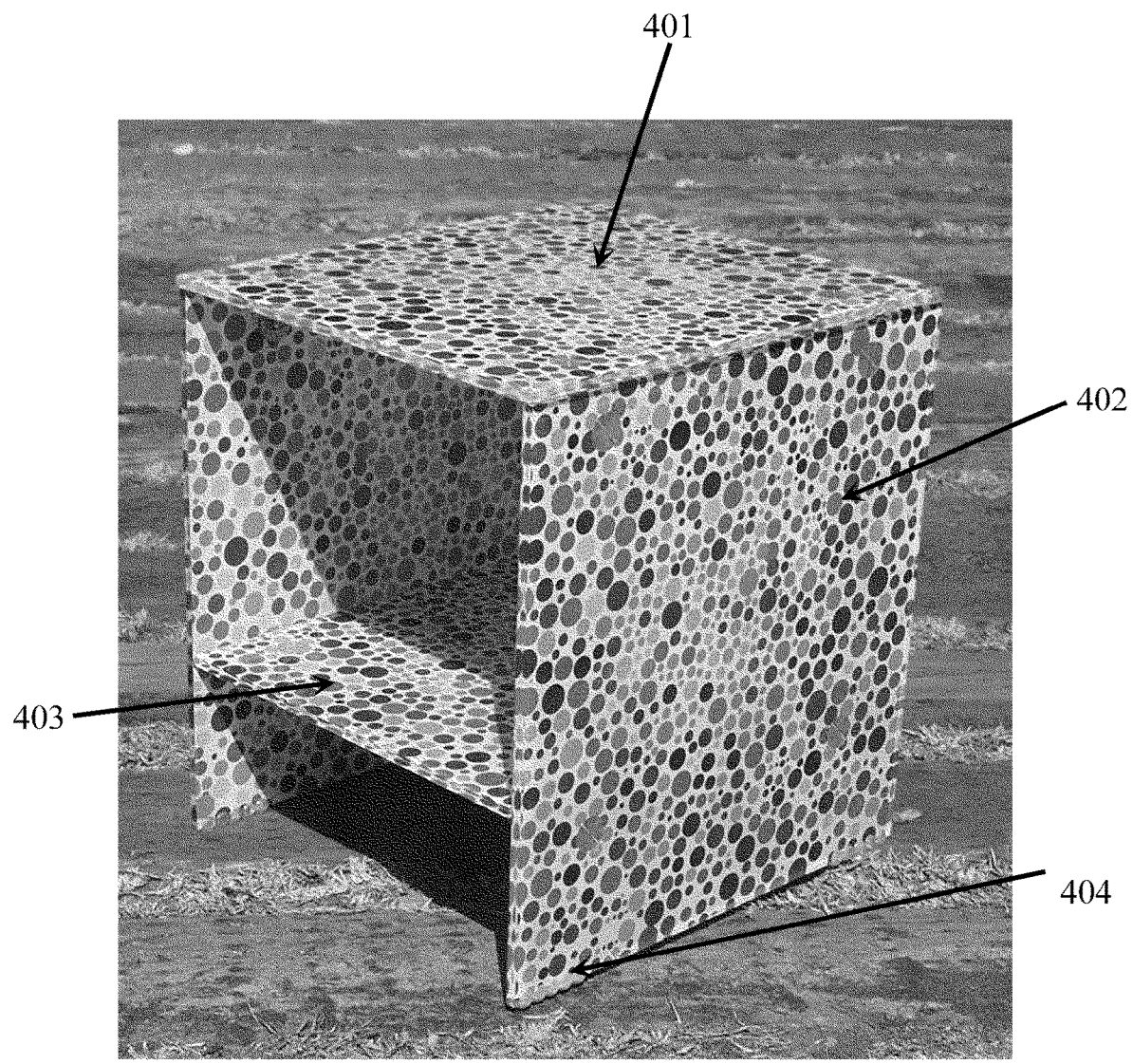
FIG. 4 is an illustrative example of an embodiment of a chair that is entirely constructed from glass.

FIG. 4 is an illustrative example of an embodiment of a chair that is entirely constructed from glass. The seat 401 can be attached to the side 402. The cross piece 403 can provide further stability to the structure as well as additional storage for items such as reading material, and can be attached to the side 402. Small feet such as 404 can prevent damage to the side 402, and can prevent any marking of the floor by the chair. Components of the chair 401, 402, and 403 can be printed with a pattern as will be illustrated with respect to FIGS. 9A-9D. The printing can provide a visual appeal to the overall design that can work as a true piece of art as well as a functioning chair.

Figure 5:
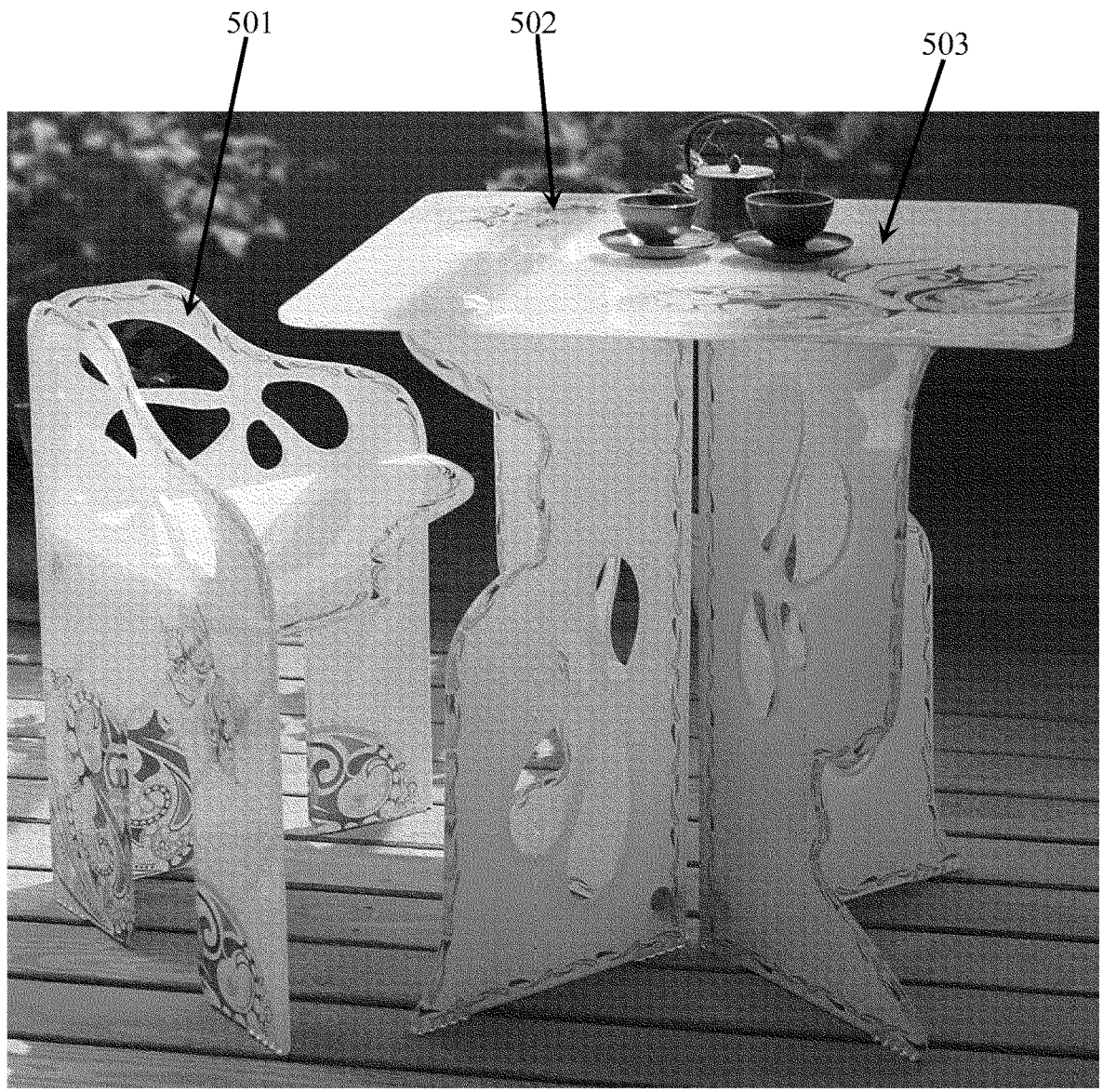
FIG. 5 is an illustrative example of an embodiment of a chair and table for outdoor use that are entirely constructed from glass.

FIG. 5 is an illustrative example of an embodiment of a chair and table for outdoor use that are entirely constructed from glass. The chair 501 can be entirely constructed from glass as described with respect to FIG. 3 and FIG. 4. The table 502 can be entirely constructed from glass as described with respect to FIG. 2. The table top 503 can be particularly suited to outdoor use due to the durable and easy to clean nature of glass.

Figure 6A:
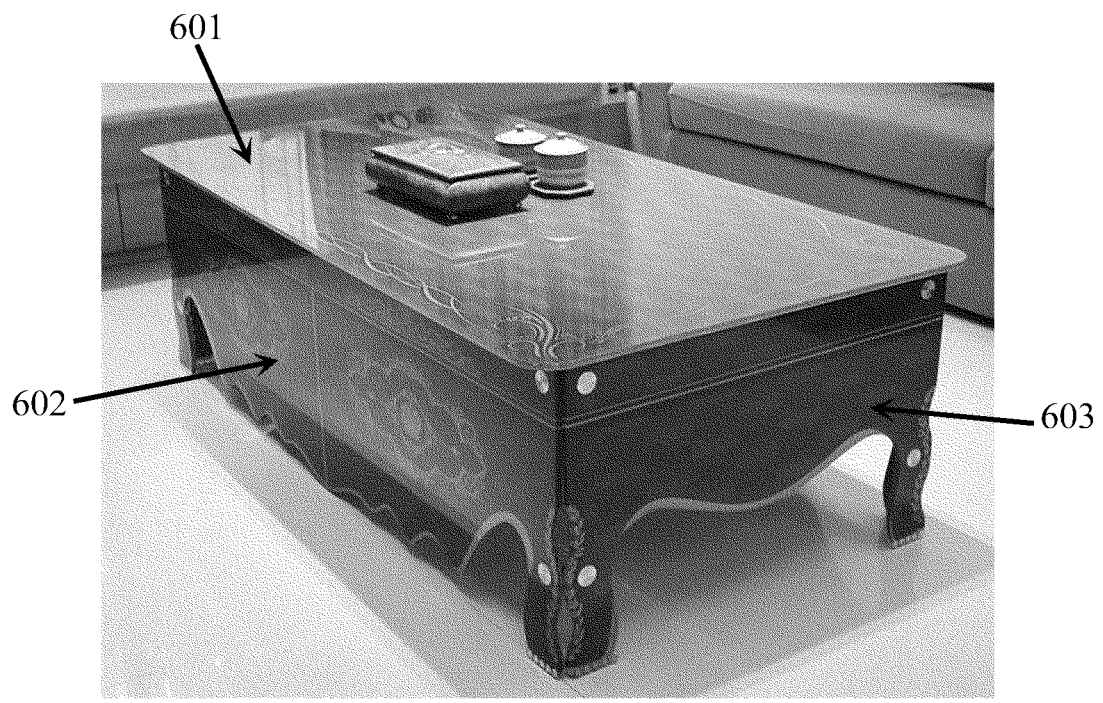
FIG. 6A is an illustrative example of an embodiment of a table that is entirely constructed from glass.

FIG. 6A is an illustrative example of an embodiment of a table that is entirely constructed from glass. The components 601, 602, and 603 can be made from glass, and can be printed with a pattern as will be illustrated with respect to FIGS. 9A-9D. The printing can provide a visual appeal to the overall design that can work as a true piece of art as well as a functioning table.

Figure 6B:
FIG. 6B is an illustrative example of an embodiment of an end table that is entirely constructed from glass.

FIG. 6B is an illustrative example of an embodiment of an end table that is entirely constructed from glass. The components 604, 605, and 606 can be made from glass, and can be printed with a pattern as will be illustrated with respect to FIGS. 9A-9D. The printing can provide a visual appeal to the overall design that can work as a true piece of art as well as a functioning table. The resulting end table can be a good visual match with the table as described with respect to FIG. 6A.

Figure 7:
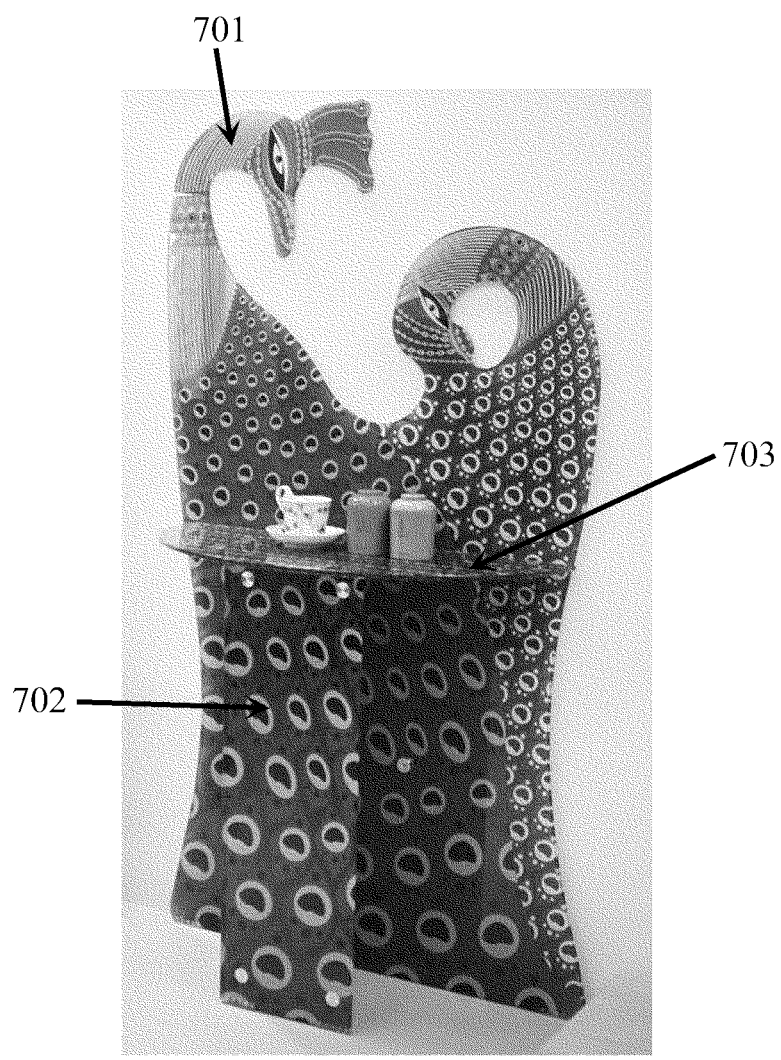
FIG. 7 is an illustrative example of an embodiment of a console table that is entirely constructed from glass.

FIG. 7 is an illustrative example of an embodiment of a console table that is entirely constructed from glass. The components 701, 702, and 703 can be made from glass, and can be printed with a pattern as will be illustrated with respect to FIGS. 9A-9D. The printing can provide a visual appeal to the overall design that can work as a true piece of art as well as a functioning table.

Figure 8:
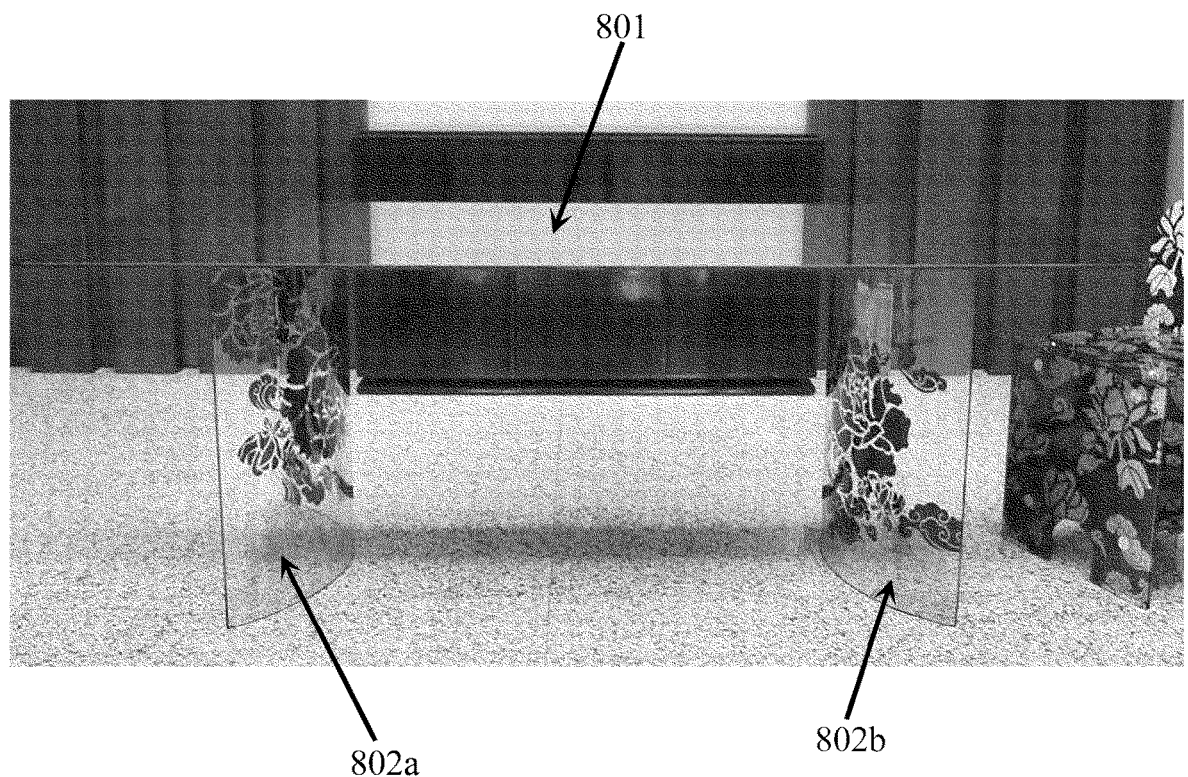
FIG. 8 is an illustrative example of an embodiment of a dining table that is entirely constructed from glass.

FIG. 8 is an illustrative example of an embodiment of a dining table that is entirely constructed from glass. The component 801 can be made from glass, and can be printed with a pattern as will be illustrated with respect to FIGS. 9A-9D. The components 802a and 802b can be made from bent printed glass, as will be illustrated with respect to FIG. 17. The printing can provide a visual appeal to the overall design that can work as a true piece of art as well as a functioning table. The bent glass of components 802a and 802b can provide an innovative and visually pleasing aspect to the table.

Figure 9A:
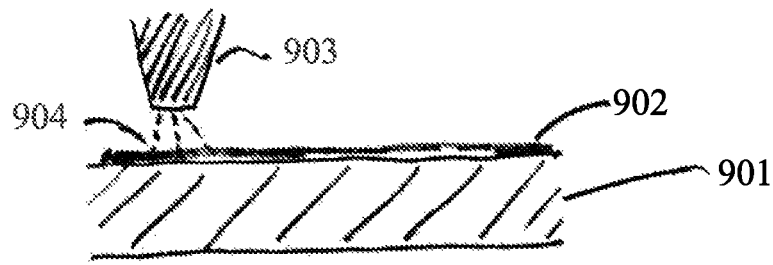
FIGS. 9A-9B are illustrative examples of an embodiment of a process to print on glass.
Figure 9B:
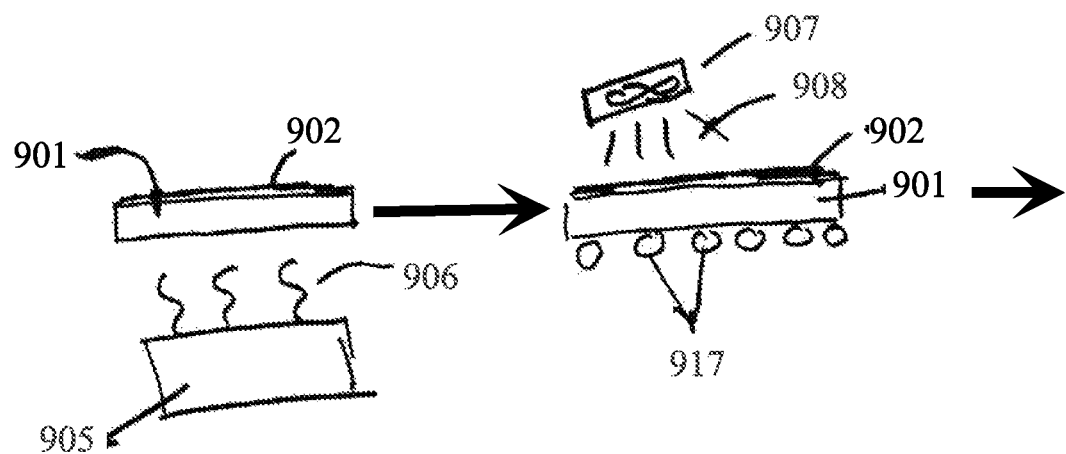

FIGS. 9A-9B are illustrative examples of an embodiment of a process to print on glass. A print head 903 can deposit ink 904 onto the glass 901 to create a layer of ink 902 with the printed pattern. This process can be implemented using, for example, a DIP-TECH™ GLASSJET PRO™ digital glass printer. Once the ink 904 is deposited on the glass 901, the glass 901 with the ink layer 902 can be heated 906 by a furnace 905 to near the melting temperature of the glass, where it can soften and begin to act as a fluid. The glass 901 can be then supported by rollers 917 while its surface is cooled by fans 907 blowing air 908 over the glass 901. This can cool the surface of the glass more quickly than the inner part, which can cause tension in the molecular structure of the glass. The tension can cause the glass becomes much stronger and far more resistant to breakage. The tension can facilitate causing the glass to break as a single unit, into pieces about 1 cm in each dimension, each of which may have no sharp edges. As a result, the glass can be extremely safe and durable.

The inks used in printing the layer of ink 902 onto the glass 901 can be made from a solvent with a suspension of a ceramic material that is similar to glass. When the ink dries (the solvent evaporates), the layer of ink 902 on the glass can be a layer of this ceramic material. The tempering process can bring the ceramic material close to its melting temperature and as a result, may fuse it into the surface of the glass. After the tempering process, the printed pattern can truly be part of the glass, and can therefore be extremely durable. Since the pattern can be made of ceramic, it may resist changing color over time, even with exposure to sunlight, heat, or water. This can make the resulting furniture and accessories ideal for outdoor use as well as indoor use.

Most existing printing is done on paper with four basic colors: cyan (blue-green), magenta (red-blue), yellow, and black (CMYK). However, the ceramic inks can be designed to be environmentally friendly, and as a result, they may be fabricated without the use of cadmium, so it may be that none of the inks have a true magenta color. To compensate for this, there can be six different ink colors: black, white, blue, green, orange, and red. The different colors that can be printed with these six inks (the color gamut) may be approximately the same as those that can be printed with CMYK inks. However, the software for generating the color selection can be somewhat limited, so a good designer may be needed to make high quality glass printing.

Figure 9C:
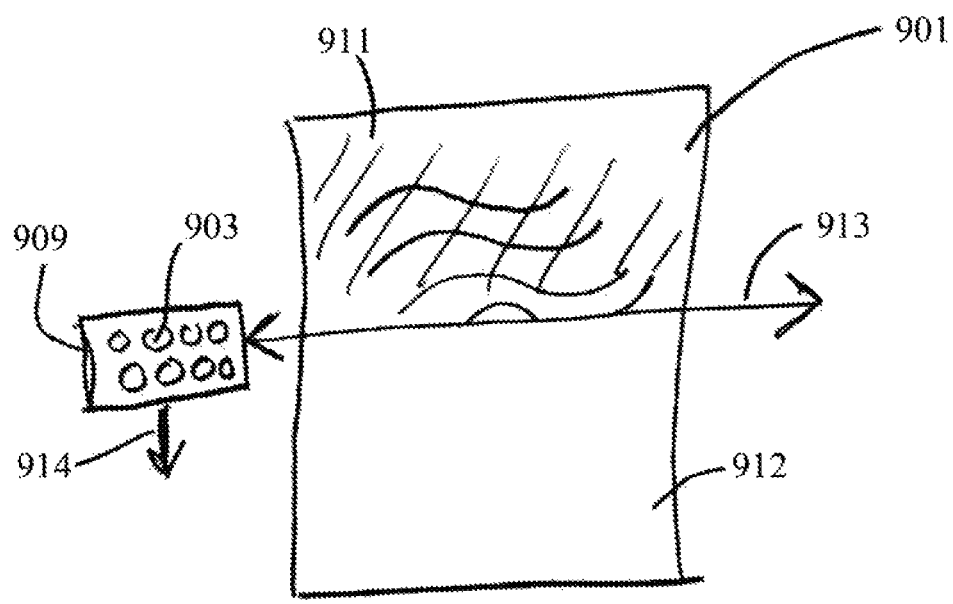
FIG. 9C is an illustrative example of an embodiment of a process to print on glass.

FIG. 9C is an illustrative example of an embodiment of a process to print on glass. The printer can have a print head 909 with multiple ink jets like 903. The print head 909 can move back and forth across the glass 901 along the path 913, and can slowly advance along the path 914. As the print head 909 makes this trajectory, the ink jets such as 903 can deposit the inks onto the glass 901. In this way, the printer can advance along the unprinted area 912 of the glass 901, leaving behind the printing 911.

Figure 9D:
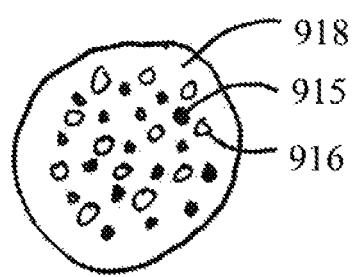
FIG. 9D is an illustrative example of an embodiment of a process to show colors other than the six ink colors, as well as patterns that are not made up of solid colors.

FIG. 9D is an illustrative example of an embodiment of a process to show colors other than the six ink colors, as well as patterns that are not made up of solid colors. The software that drives the printer can decompose the image into a halftone representation 918, which is shown greatly magnified. The halftone representation 918 can be similar to a halftone that is used in color printing on paper with CMYK inks, but with the six-color separation as described above. The printer can then print the halftone as small areas of the six color inks, represented by the dots of ink 915 and 916.

Since the printing process shown in FIGS. 9A-9D can be a digital ink jet process, the printing of the furniture and accessories can easily be customized to the requirements at hand. This can be something as obvious as printing a logo, but can also address a more subtle artistic requirement such as a color or pattern theme that fits into a larger design theme. This can give a huge palette of options to the interior designer that has not previously been available in furniture and accessories.

Figure 10:
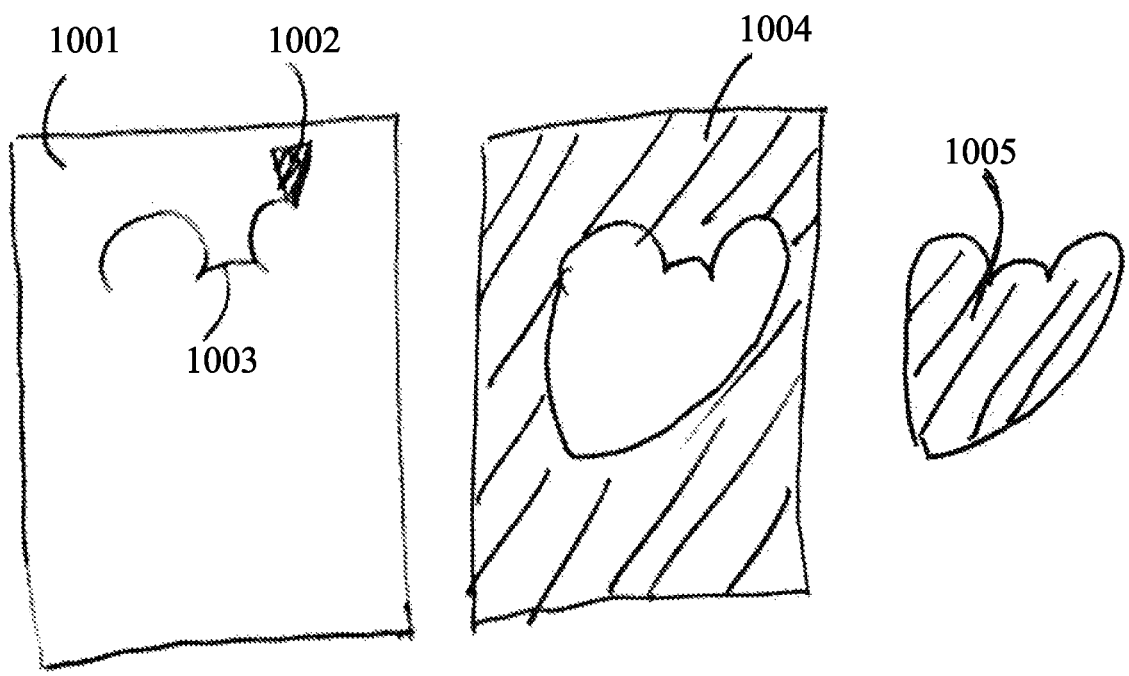
FIG. 10 is an illustrative example of an embodiment of a process by which shaped pieces of glass are used in con

FIG. 10 is an illustrative example of an embodiment of a process by which shaped pieces of glass are used in conjunction with the printing to provide an interesting and visually appealing design element. As previously illustrated with respect to FIG. 2 and FIG. 3, the shape as well as the pattern can be an integral part of the design. Before printing and tempering, the glass 1001 can be cut with a tool 1002. This tool can be, for example, a high-velocity water jet glass cutter. The tool can be part of a numerically controlled (NC) machine that cuts a pattern 1003 as specified by the designer. When the NC machine is finished, the shaped piece of glass 1005 can be removed from the glass material 1004.

Figure 11A:
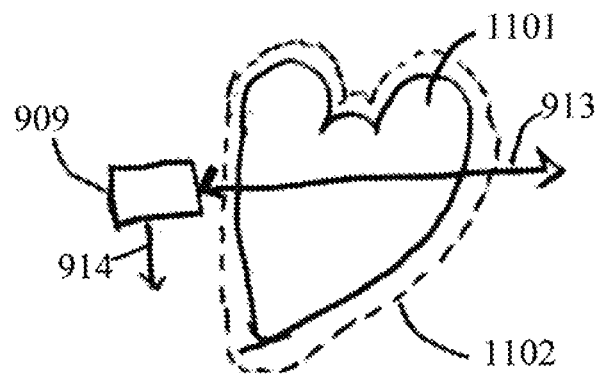
- FIGS. 11A-11B are illustrative examples of an embodiment of a process for printing the shaped glass.
Figure 11B:
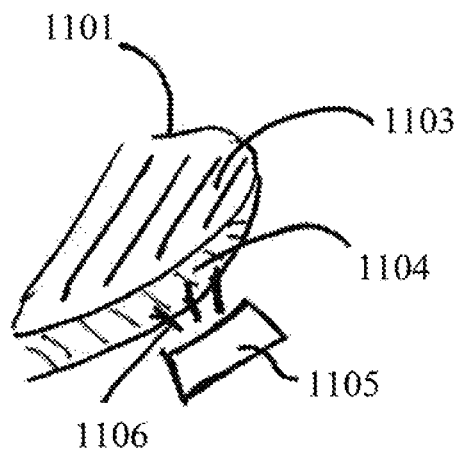

FIGS. 11A-11B are illustrative examples of an embodiment of a process for printing the shaped glass. The print head 909 can cover the glass 1101 using the back and forth motion 913 while advancing along the path 914, as previously illustrated with respect to FIG. 9C. In this case, however, the ink can be controlled by the printer to cover just an area 1102 that is slightly larger than the shaped glass 1101. In printing terminology this can be referred to as a "bleed". FIG. 11B is an illustrative example of an embodiment of the result. The shaped glass 1101 can have ink on both the surface 1103 and the edge 1104. The ink on the surface can continue all the way to the edge, as desired for its visual appeal. The ink that ends up on the edge 1104, however, may be undesired. Since the glass has not yet been tempered, this ink may be relatively easy to clean off 1106 with a cleaner 1105, leaving the piece 1101 printed exactly as desired and ready for tempering. Note that in paper printing, the process can be reversed: the material is printed with a bleed, and then cut to the final shape. This may not be feasible with glass printing because the NC machine doing the cutting would disturb the ink, since the ink may smear relatively easily before the tempering process.

Figure 12A:
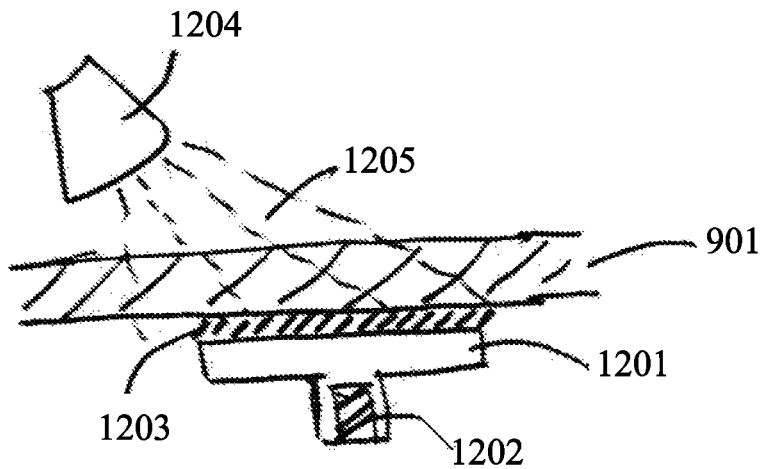
FIG. 12A is an illustrative example of an embodiment of a process for constructing, attaching, and using connectors.

FIG. 12A is an illustrative example of an embodiment of a process for constructing, attaching, and using connectors. The connector 1201 can be a circular aluminum disc with a very flat surface on one side and a threaded receptacle 1202 on the other side. The flat surface can be cleaned very well with a solvent, and a corresponding circular area on the glass 901 can also be cleaned with a solvent. The connector 1201 can be attached to the glass with a glue 1203 that is designed for this purpose, and the glue can be cured rapidly and permanently using an ultraviolet (UV) lamp 1204. The UV light 1205 can cure the glue. The connector 1201 can be attached to the glass 901 after the printing and tempering process described with respect to FIGS. 9A-9D, so it may be very important that the printed pattern has a circular unprinted (transparent) area with no ink in it that corresponds with the area where the connector 1201 is attached.

In this way, the glue can be attached directly to the glass 901 instead of the ceramic layer created during tempering. This direct attachment to the glass can create a stronger bond.

Figure 12B:
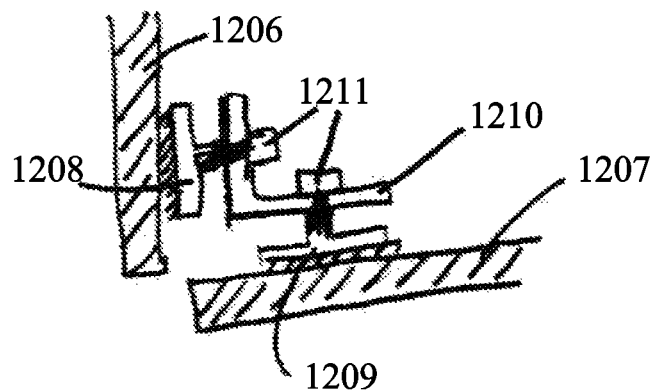
FIG. 12B is an illustrative example of an embodiment of a method for using connectors to join two pieces of glass.

FIG. 12B is an illustrative example of an embodiment of a method for using connectors to join two pieces of glass. Connector 1208 can be attached to glass 1206, and connector 1209 can be attached to glass 1207. A metal bracket 1210, which may be aluminum, can be attached to the two connectors 1208 and 1209 with bolts 1211. The bracket 1210 can then hold the two pieces of glass 1206 and 1207 firmly in place relative to each other.

Figure 13A:
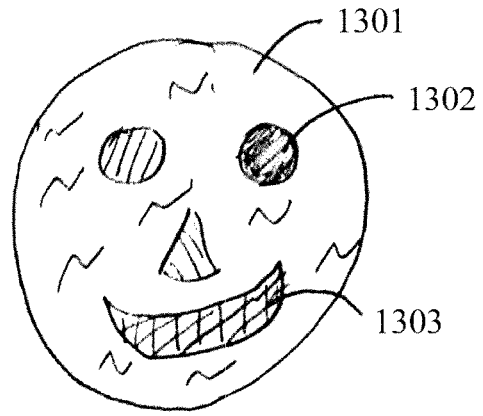
FIG. 13A is an illustrative example of an embodiment of a method for incorporating connectors into a design in a visually interesting and pleasing way.

FIG. 13A is an illustrative example of an embodiment of a method for incorporating connectors into a design in a visually interesting and pleasing way. FIG. 13A shows a diagram of a pattern 1301 of a face. The elements of the face such as the mouth 1303 can be printed onto the glass, but one of the eyes 1302 can be strategically located in a section of the glass that requires a structural connector, and can left transparent. The circular connector 1302 can be attached after printing and tempering, and can complete the pattern 1301 without disrupting it.

Figure 13B:
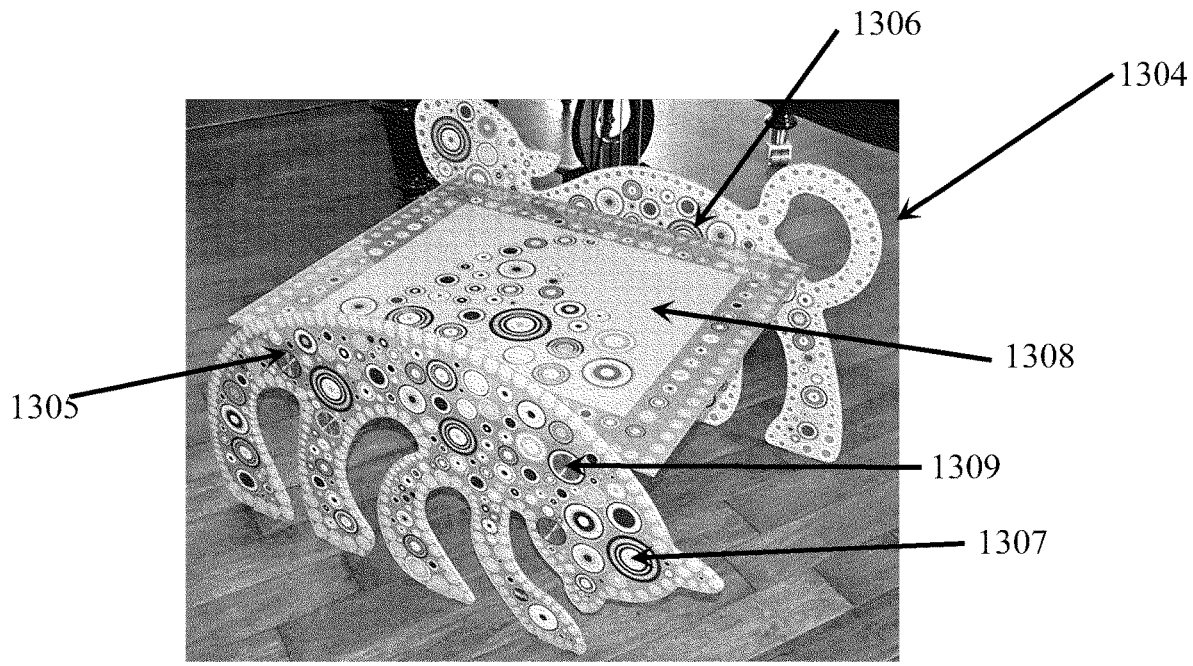
FIG. 13B is an illustrative example of an embodiment of a table that incorporates connectors into a design in a visually interesting and pleasing way.

FIG. 13B is an illustrative example of an embodiment of a table that incorporates connectors into a design in a visually interesting and pleasing way. The "Money Cat" table 1304 can be designed with end pieces 1305 and 1306 in the shape of cats and printed with a pleasing variety of circular shapes like 1307 that invoke the image of coins. At the point where the end piece 1305 needs to be attached to the table top 1308, the connector 1309 can be part of the pattern of circular shapes.

Figure 13C:
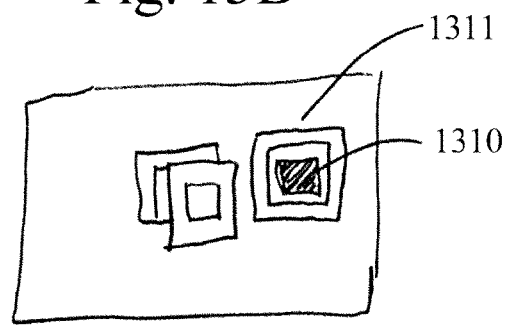
FIG. 13C is an illustrative example of an embodiment of a method for incorporating non-circular connectors into a design in a visually interesting and pleasing way.

FIG. 13C is an illustrative example of an embodiment of a method for incorporating non-circular connectors into a design in a visually interesting and pleasing way. Although glass connectors may be circular, glass connectors can be fabricated in any shape. The printing process can easily accommodate leaving transparent areas in the pattern for non-circular connectors. FIG. 13C illustrates an embodiment of a square connector 1310 as part of a design 1311 that can be made up largely of square patterns.

Figure 14A:
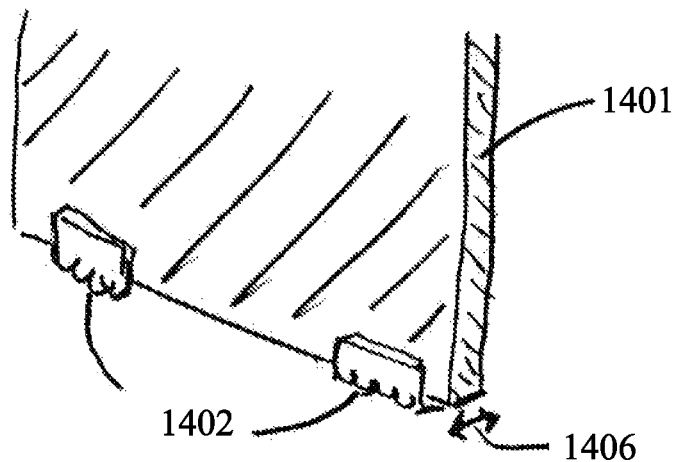
FIGS. 14A-14B are illustrative examples of an embodiment of a method for using rubber feet to protect the edges of a glass element that must come into contact with the floor.
Figure 14B:
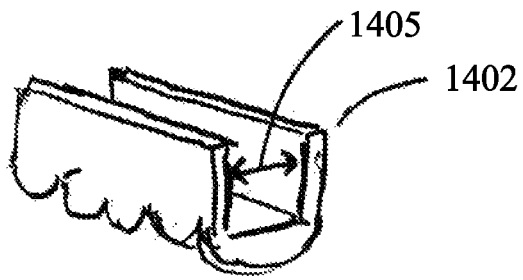

FIGS. 14A-14B are illustrative examples of an embodiment of a method for using rubber feet to protect the edges of a glass element that must come into contact with the floor. Tempered glass 1401 can be most sensitive to breakage on edges and corners, because that is where the internal molecular tension of the glass is unbalanced. Therefore, it can be important to protect the edges of the glass 1401 from scratches and impacts. Additionally, glass 1401 can be harder than a wooden floor, so it may also be important to protect wooden floors from scratches and marring that might result from movement of the furniture in ordinary use. FIG. 14A illustrates an embodiment of the use of small rubber feet 1402 that can slide over the edge of the glass 1401. FIG. 14B illustrates an embodiment of the detail of a rubber foot 1402. The rubber foot 1402 can be made of a silicone rubber material that naturally has a high coefficient of friction, and can be manufactured so that the gap 1405 between the two sides is slightly smaller than the thickness 1406 of the glass 1401. Since the silicone rubber material is flexible, the rubber foot 1402 can be quite easy to install and remove from the edge of the glass 1401, but its high coefficient of friction and snug fit can keep it in place once it is installed.

Figure 14C:
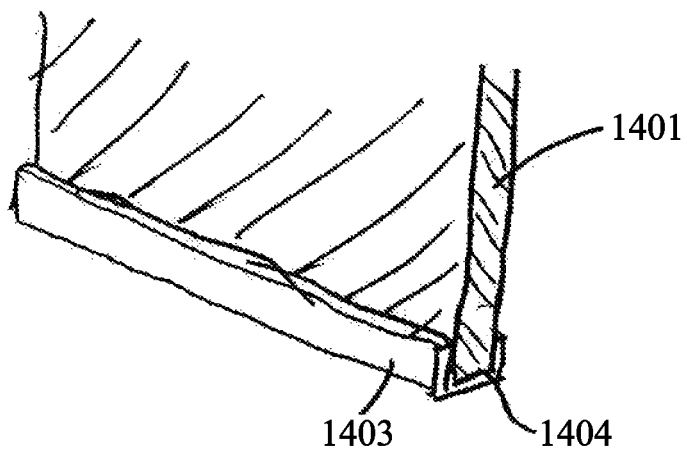
FIG. 14C is an illustrative example of an embodiment of a method for using a long piece of silicone rubber to protect the edges of a glass element that must come into contact with the floor, when the glass element is a heavier piece or a piece that is more likely to get moved frequently.

FIG. 14C is an illustrative example of an embodiment of a method for using a long piece of silicone rubber to protect the edges of a glass element that must come into contact with the floor, when the glass element is a heavier piece or a piece that is more likely to get moved frequently. When the glass 1401 is a heavier piece or a piece that is more likely to get moved frequently, the rubber feet 1402 may shift or come off during ordinary use, so a long piece of silicone rubber 1403 can be manufactured that matches the length of the glass 1401. This piece 1403 can then be installed at the factory and glued into place 1404 so that it will not become detached from the glass 1401.

Figure 15:
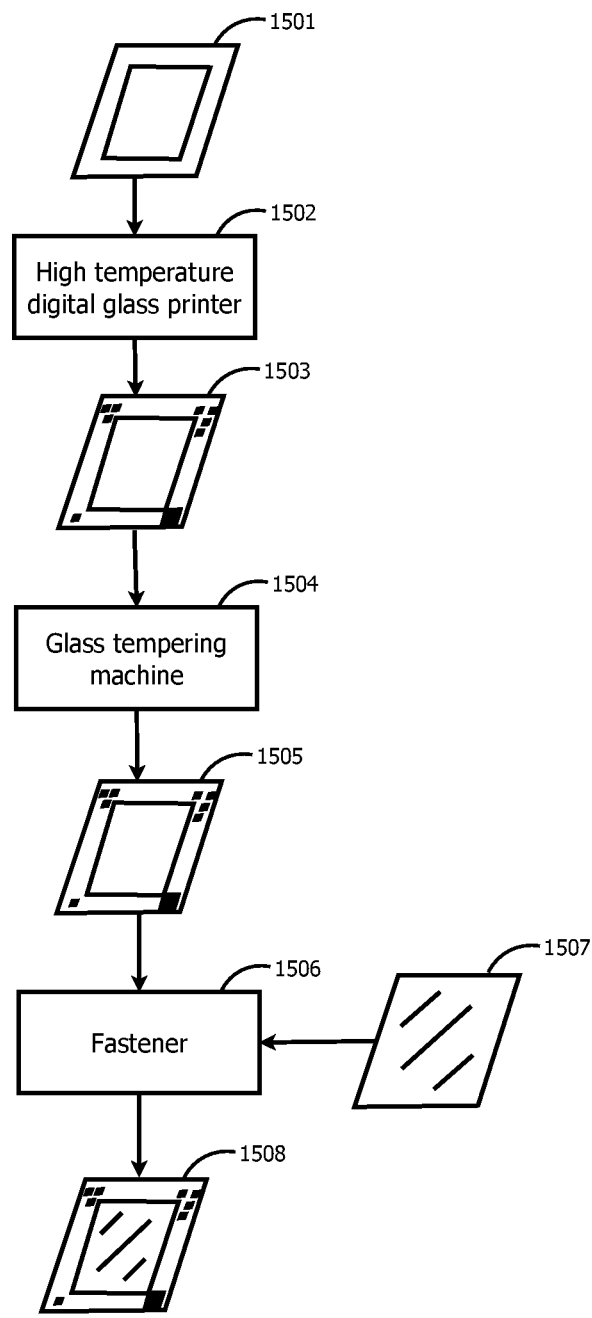
FIG. 15 is an illustrative diagram of an embodiment of a method for creating a decorative mirror that is entirely made of glass.

FIG. 15 is an illustrative diagram of an embodiment of a method for creating a decorative mirror that is entirely made of glass. The glass frame 1501 for the mirror can be printed by a high temperature digital glass printer 1502 to make a printed glass frame 1503 with a pattern printed on the glass frame. The printed glass frame 1503 can be tempered by a glass tempering machine 1504 to make a tempered glass frame 1505 with a pattern printed on the tempered glass frame 1505. The tempered glass frame 1505 can be fastened to a mirror 1507 by a fastener 1506 to create the decorative mirror 1508 entirely made of glass.

Figure 16:
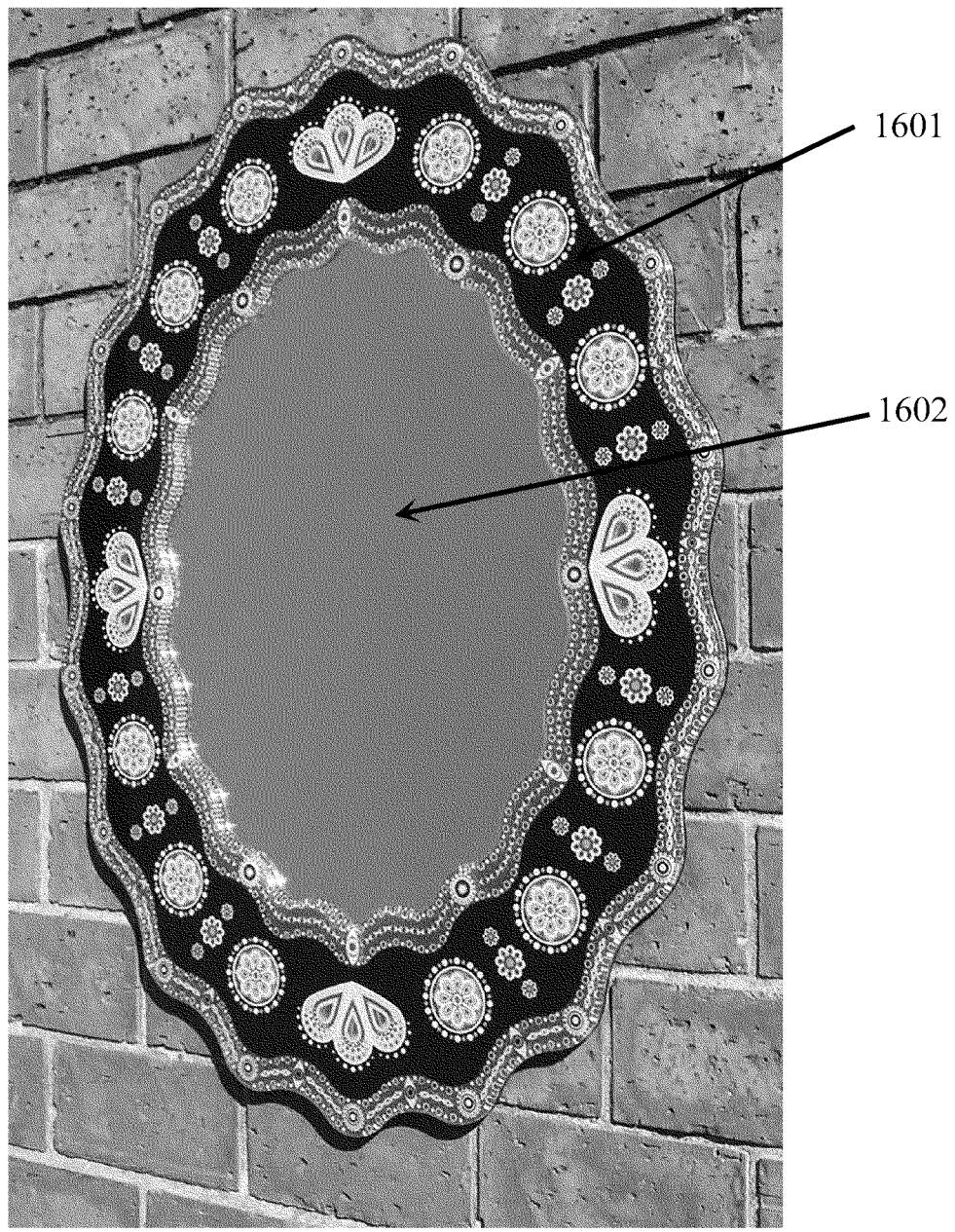
FIG. 16 is an illustrative example of an embodiment of a decorative mirror that is entirely constructed from glass.

FIG. 16 is an illustrative example of an embodiment of a decorative mirror that is entirely constructed from glass. The mirror element 1602 can be manufactured using an environmentally friendly process and can be made from a piece of glass that is shaped in a way to convey an interesting design as was illustrated with respect to FIG. 10. The frame 1601 of the mirror can be shaped in the same way to match the design and printed with a pattern as was illustrated with respect to FIGS. 11A-11B. The printing on the frame 1601 can provide a visual appeal to the overall design that works as a true piece of art as well as a functioning mirror. The printed frame 1601 can be glued to the mirror element 1602 to make the finished piece.

Figure 17:
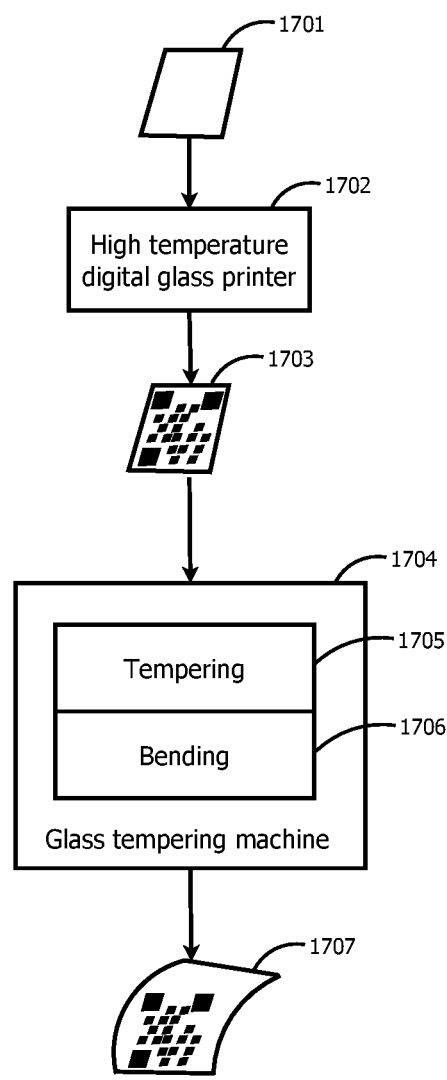
FIG. 17 is an illustrative diagram of an embodiment of a method for making a bent piece of printed, tempered glass.

FIG. 17 is an illustrative diagram of an embodiment of a method for making a bent piece of printed, tempered glass. A flat glass 1701 can be printed by a high temperature digital glass printer 1702 to make a printed flat glass 1703 with a pattern printed on the flat glass. The printed flat glass 1703 can be tempered 1705 and bent 1706 by a glass tempering machine 1704 to make a bent, tempered glass 1707 with a pattern printed on the bent, tempered glass 1707.

Figure 18:
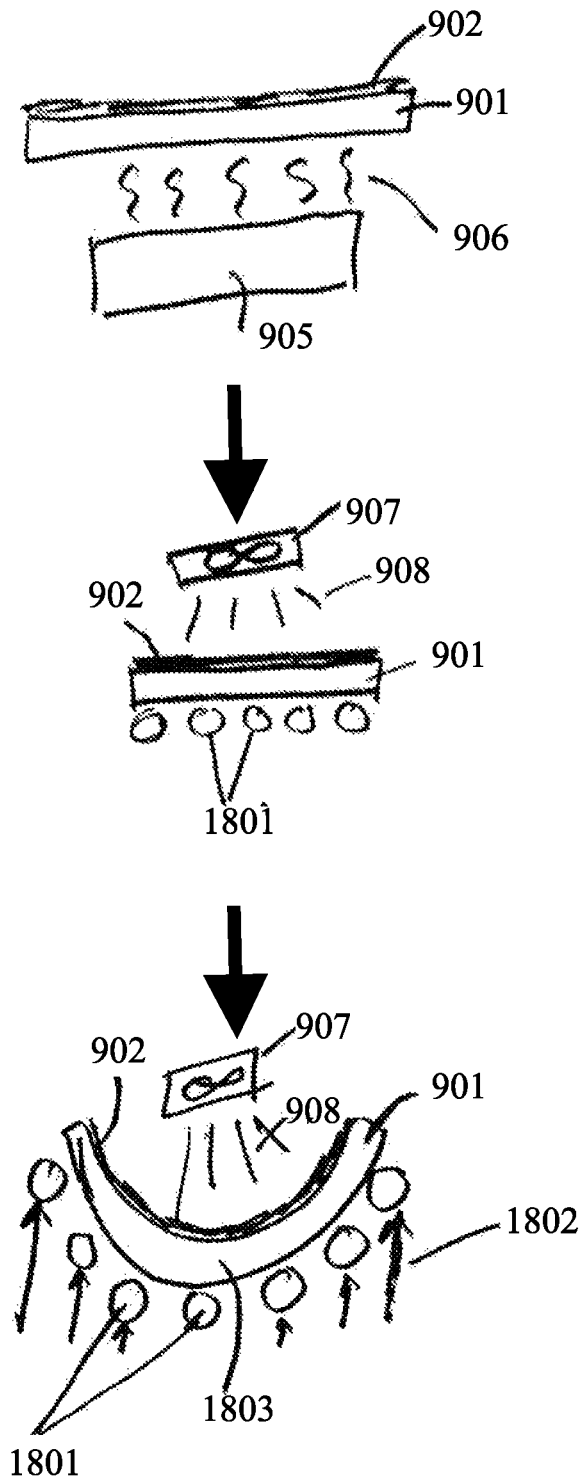
FIG. 18 is an illustrative diagram of an embodiment of a method for making a bent piece of printed, tempered glass.

FIG. 18 is an illustrative diagram of an embodiment of a method for making a bent piece of printed, tempered glass. The tempering process is similar to that illustrated with reference to FIG. 9B. The glass 901 with the ink layer 902 can be heated 906 by a furnace 905 to near the melting temperature of the glass where it softens and begins to act as a fluid. The glass 901 can then be supported by rollers 1801 while its surface is cooled by fans 907 blowing air 908 over the glass 901. As the air 908 is tempering the glass 901, the rollers 1801 supporting the glass 901 can move upward 1802 into a curved shape. Since the glass 901 is near its melting temperature and is pliable, it can bend into a curved shape following the rollers 1801 and then cool and temper in this bent position. The result can be a piece of printed, tempered glass 1803 that is bent into a curved shape.

Figure 19:
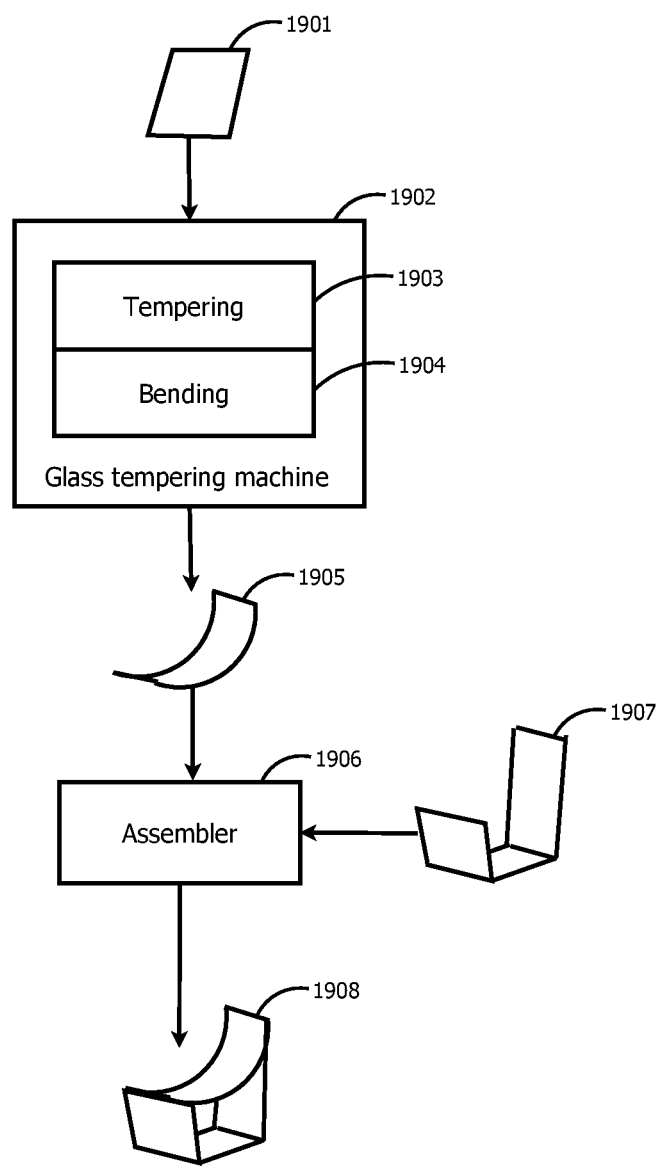
FIG. 19 is an illustrative diagram of an embodiment of a method for making a chair.

FIG. 19 is an illustrative diagram of an embodiment of a method for making a chair. A flat glass 1901 can be tempered 1903 and bent 1904 by a glass tempering machine 1902 to make a bent, tempered glass 1905. The bent, tempered glass 1905 can be assembled with a supporting structure 1907 by an assembler 1906 to make a chair 1908.

Figure 20:
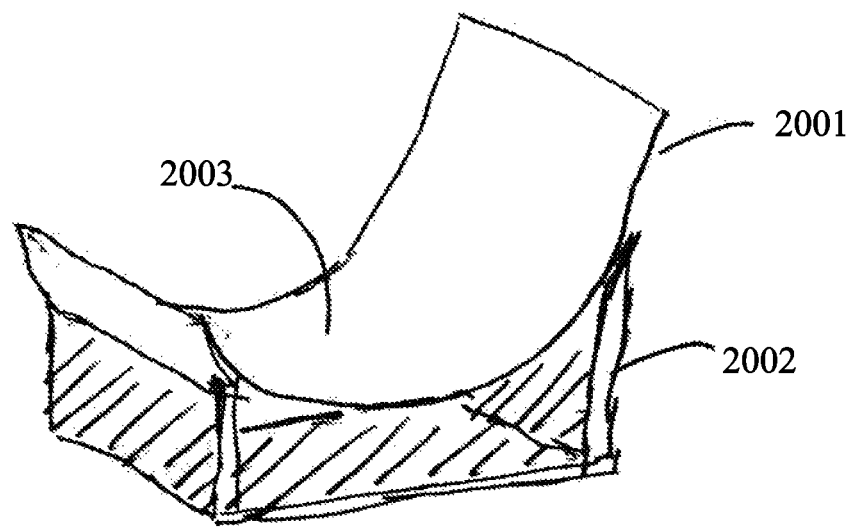
FIG. 20 is an illustrative example of an embodiment of a chair.

FIG. 20 is an illustrative example of an embodiment of a chair. A piece of curved glass 2001 can be supported by a frame 2002. The frame 2002 can also be made out of glass, or can be made from metal or wood. The curved glass provides a reclined seat 2003 that can serve as a remarkably comfortable chair.

Figure 21:
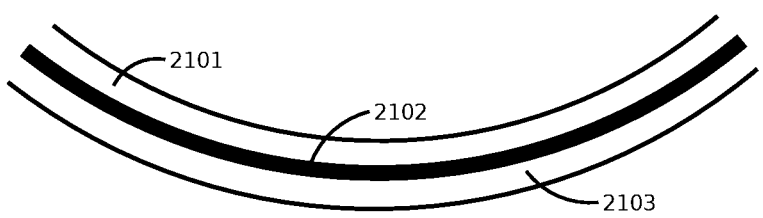
FIG. 21 is an illustrative diagram of an embodiment of a method for making safety glass for the seat of a chair.

FIG. 21 is an illustrative diagram of an embodiment of a method for making safety glass for the seat of a chair. One of the concerns in making a chair as illustrated with respect to FIG. 20 can be the failure modes of the chair, especially since the curved glass 2001 is in direct forceful contact with the body of its user, unlike the glass of a table top. If the glass 2001 were to break, it could leave the body of the user unsupported to fall to the floor on top of the broken glass 2001 that could also be falling to the floor. FIG. 21 illustrates an embodiment of the construction of safety glass that can be used to prevent this failure mode. Safety glass has been in widespread use in automobile windshields for the same reason, with much higher forces involved. If an unrestrained passenger strikes the windshield from inside the automobile during a collision, the windshield can be designed to keep the passenger inside the automobile and avoid lacerations from broken glass. For the chair, glass 2101 can be the curved printed, tempered glass 1803 as illustrated with respect to FIG. 18. This can be glued to a curved piece of clear, non-tempered glass 2103 with a thin piece of clear strong flexible plastic 2102 sandwiched between the tempered glass 2101 and the non-tempered glass 2103. The curved, non-tempered glass 2103 can be manufactured in a manner similar to the embodiment as illustrated with respect to FIG. 18, but without the air jets 908, so that no internal molecular tension is set up in the glass 901. If the tempered glass 2101 should break for some reason, the non-tempered glass 2103 and plastic 2102 can continue to support the load, and the plastic 2102 can hold all the pieces of the tempered glass 2101, which is glued to the plastic 2102, in place. Additionally, the small pieces of broken tempered glass 2101 may have no sharp edges. As a result, the person seated in the chair may not fall to the floor, and may not be exposed to any sharp edges.

References to "or" may be construed as inclusive so that any terms described using "or" may indicate any of a single, more than one, and all of the described terms.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

While this specification contains many specific implementation details, these should not be construed as limitations on the scope of any inventions or of what may be claimed, but rather as descriptions of features specific to particular implementations of particular inventions. Certain features described in this specification in the context of separate embodiments can also be implemented in combination in a single embodiment. Conversely, various features described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A table comprising:
a horizontal tempered glass table top; and
at least two vertical tempered glass support pieces connected to the table top;
wherein:
the support pieces support the table on a floor;
the table top and the support pieces are structural elements of the table; and
all structural elements of the table are made of tempered glass.

2. The table of claim 1, further comprising:
a tempered glass cross piece connected to at least two of the support pieces;
wherein:
the cross piece provides stability to the table.

3. The table of claim 2, wherein:
at least one of the table top, one support piece, and the cross piece comprise a pattern printed by a high temperature digital glass printer.

4. The table of claim 2, wherein:
at least one support piece is connected to the cross piece using a glued glass connector.

5. The table of claim 1, further comprising:
at least one foot on at least one of the support pieces.

6. The table of claim 1, wherein:
at least one of the table top and one support piece comprise a pattern printed by a high temperature digital glass printer.

7. The table of claim 1, wherein:
at least one support piece is connected to the table top using a glued glass connector.

8. The table of claim 1, wherein:
at least one of the support pieces is shaped by a glass cutting machine.

9. A table comprising:
a horizontal tempered glass table top; and
at least one vertical tempered glass support piece connected to the table top;
wherein:
at least one support piece is bent tempered glass;
at least one support piece supports the table on a floor;
the table top and the support pieces are structural elements of the table; and
all structural elements of the table are made of tempered glass.

10. The table of claim 9, further comprising:
at least one foot on at least one of the support pieces.

11. The table of claim 9, wherein:
at least one of the table top and one support piece comprise a pattern printed by a high temperature digital glass printer.

12. The table of claim 9, wherein:
at least one support piece is connected to the table top using a glued glass connector.

13. A table comprising:
a horizontal tempered glass table top means for supporting an item placed on the table;
at least two vertical tempered glass support means for supporting the table top means on a floor; and
a first connection means for connecting at least one support means to the table top means;
wherein:
the table top means and the support means are structural elements of the table; and
all structural elements of the table are made of tempered glass.

14. The table of claim 13, further comprising:
at least one tempered glass stabilizing means for providing stability to the table; and
a second connection means for connecting at least one stabilizing means to at least one support means.

* * * * *